United States Patent
Devers et al.

(10) Patent No.: US 11,918,982 B2
(45) Date of Patent: *Mar. 5, 2024

(54) METHOD FOR REJUVENATING A NONREGENERATED SPENT CATALYST FROM A PROCESS FOR THE HYDRODESULFURIZATION OF GASOLINES

(71) Applicant: IFP Energies Nouvelles, Rueil-Malmaison (FR)

(72) Inventors: Elodie Devers, Rueil-Malmaison (FR); Etienne Girard, Rueil-Malmaison (FR); Philibert Leflaive, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 194 days.

This patent is subject to a terminal disclaimer.

(21) Appl. No.: 17/415,059

(22) PCT Filed: Dec. 10, 2019

(86) PCT No.: PCT/EP2019/084440
§ 371 (c)(1),
(2) Date: Jun. 17, 2021

(87) PCT Pub. No.: WO2020/126679
PCT Pub. Date: Jun. 25, 2020

(65) Prior Publication Data
US 2022/0062873 A1 Mar. 3, 2022

(30) Foreign Application Priority Data

Dec. 18, 2018 (FR) ........................ 1873235

(51) Int. Cl.
| | | |
|---|---|---|
| *B01J 23/00* | (2006.01) | |
| *B01J 23/882* | (2006.01) | |
| *B01J 23/94* | (2006.01) | |
| *B01J 27/19* | (2006.01) | |
| *B01J 27/28* | (2006.01) | |
| *B01J 35/10* | (2006.01) | |
| *B01J 37/02* | (2006.01) | |
| *B01J 37/20* | (2006.01) | |
| *B01J 38/12* | (2006.01) | |
| *B01J 38/62* | (2006.01) | |
| *C10G 45/08* | (2006.01) | |

(52) U.S. Cl.
CPC .............. *B01J 23/94* (2013.01); *B01J 23/002* (2013.01); *B01J 23/882* (2013.01); *B01J 27/19* (2013.01); *B01J 27/285* (2013.01); *B01J 35/1019* (2013.01); *B01J 37/0236* (2013.01); *B01J 37/20* (2013.01); *B01J 38/12* (2013.01); *B01J 38/62* (2013.01); *C10G 45/08* (2013.01); *C10G 2300/1044* (2013.01); *C10G 2300/202* (2013.01); *C10G 2300/70* (2013.01); *C10G 2400/02* (2013.01)

(58) Field of Classification Search
CPC ...... B01J 23/882; B01J 23/8885; B01J 38/12; B01J 38/62
See application file for complete search history.

(56) References Cited

U.S. PATENT DOCUMENTS

| | | | |
|---|---|---|---|
| 8,128,811 B2 | 3/2012 | Mccarthy et al. | |
| 10,464,054 B2 | 11/2019 | Carrette | |
| 11,779,908 B2 * | 10/2023 | Devers | B01J 27/285 208/216 R |
| 2005/0159296 A1 * | 7/2005 | Ginestra | B01J 38/48 502/30 |
| 2009/0261019 A1 | 10/2009 | Mccarthy et al. | |
| 2010/0133148 A1 * | 6/2010 | Timmler | B01J 37/20 208/240 |
| 2018/0133706 A1 | 5/2018 | Carrette | |

FOREIGN PATENT DOCUMENTS

| | | | | |
|---|---|---|---|---|
| FR | 3035600 A1 | 11/2016 | | |
| WO | WO-9420213 A1 * | 9/1994 | | B01J 23/90 |
| WO | 2009/126319 A1 | 10/2009 | | |

OTHER PUBLICATIONS

International Search Report dated Feb. 11, 2020 issued in corresponding PCT/EP2019/084440 application (2 pages).
M.D. Argyle et al., "Heterogeneous Catalyst Deactivation and Regeneration: A Review" Catalysts, vol. 5 (2015) pp. 145-170.

* cited by examiner

*Primary Examiner* — Jun Li
(74) *Attorney, Agent, or Firm* — Millen, White, Zelano & Branigan, P.C.; Brion P. Heaney

(57) ABSTRACT

The invention relates to a process for the rejuvenation of an at least partially spent catalyst resulting from a hydrotreating process, said at least partially spent catalyst resulting from a fresh catalyst comprising a metal from group VIII, a metal from group VIb, an oxide support, and optionally phosphorus, said at least partially spent catalyst additionally comprising carbon in a content of between 2% and 20% by weight, with respect to the total weight of the at least partially spent catalyst, and sulfur in a content of between 1% and 8% by weight, with respect to the total weight of the at least partially spent catalyst, said process comprising the following stages:
a) said spent catalyst is brought into contact with an impregnation solution containing a compound comprising a metal from group VIb,
b) a drying stage is carried out at a temperature of less than 200° C.

15 Claims, No Drawings

METHOD FOR REJUVENATING A NONREGENERATED SPENT CATALYST FROM A PROCESS FOR THE HYDRODESULFURIZATION OF GASOLINES

FIELD OF THE INVENTION

The present invention relates to a process for the rejuvenation of a catalyst used in a hydrotreating process and to the use of the rejuvenated catalyst in a process for the hydrodesulfurization of a gasoline cut.

STATE OF THE ART

Sulfur is an element naturally present in crude oil and is thus present in gasoline and diesel fuel if it is not removed during refining. However, sulfur in gasoline interferes with the efficiency of emission reduction systems (catalytic converters) and contributes to air pollution. In order to combat environmental pollution, all countries are consequently gradually adopting strict sulfur specifications, the specifications being, for example, 10 ppm (weight) of sulfur in commercial gasolines in Europe, China, the United States and Japan. The problem of reducing sulfur contents is essentially focused on gasolines obtained by cracking, whether catalytic (FCC, Fluid Catalytic Cracking) or non-catalytic (coking, visbreaking, steam cracking), the main precursors of sulfur in gasoline pools.

One solution, well known to a person skilled in the art, for reducing the sulfur content consists in carrying out a hydrotreating (or hydrodesulfurization) of the hydrocarbon cuts (and in particular of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked in particular to the hydrogenation of the olefins present in this type of gasoline concomitantly with the hydrodesulfurization. Unlike other hydrotreating processes, in particular those for feedstocks of gas oil type, the hydrodesulfurization of gasolines thus has to make it possible to respond to a double antagonistic constraint: to provide extreme hydrodesulfurization of gasolines and to limit the hydrogenation of the unsaturated compounds present.

The most widely used route for responding to the double problem mentioned above consists in employing processes in which the sequence of unit stages makes it possible simultaneously to maximize the hydrodesulfurization while limiting the hydrogenation of the olefins. Thus, the most recent processes, such as the Prime G+ (trademark) process, make it possible to desulfurize cracked gasolines rich in olefins, while limiting the hydrogenation of the mono-olefins and consequently the loss of octane and the high hydrogen consumption which results therefrom. Such processes are, for example, described in the patent applications EP 1 077 247 and EP 1 174 485.

Obtaining the desired reaction selectivity (ratio of hydrodesulfurization to hydrogenation of olefins) can thus be partly due to the choice of the process but, in all cases, the use of an intrinsically selective catalytic system is very often a key factor. In general, the catalysts used for this type of application are catalysts of sulfide type containing an element from group VIb (Cr, Mo, W) and an element from group VIII (Fe, Ru, Os, Co, Rh, Ir, Pd, Ni, Pt). Thus, in the U.S. Pat. No. 5,985,136, it is claimed that a catalyst exhibiting a surface concentration of between $0.5 \times 10^{-4}$ and $3 \times 10^{-4}$ g of $MoO_3/m^2$ makes it possible to achieve high selectivities in hydrodesulfurization (93% hydrodesulfurization (HDS) against 33% hydrogenation of olefins (HOO)). Furthermore, according to the U.S. Pat. Nos. 4,140,626 and 4,774,220, it can be advantageous to add a dopant (alkali metal, alkaline earth metal) to the conventional sulfide phase (CoMoS) with the aim of limiting the hydrogenation of olefins. The documents U.S. Pat. No. 8,637,423 and EP 1 892 039, which describe selective hydrodesulfurization catalysts, are also known in the state of the art.

During its use for the hydrotreating of a petroleum cut, a hydrotreating catalyst experiences a decrease in its activity due to the deposition of coke and/or of compounds which are sulfur-based or contain other heteroelements. Beyond a certain period, its replacement is thus necessary. In particular, the tightening of the sulfur specifications of fuels induces an increase in the frequency of replacement of the catalyst, which leads to an increase in the cost associated with the catalyst and to an increase in the amount of spent catalyst.

In order to combat these disadvantages, the regeneration (gentle calcination) of catalysts for the hydrodesulfurization of middle distillates (gas oil) or of spent residues is an economically and ecologically advantageous process because it makes it possible to use these catalysts again in industrial units rather than to landfill them or to recycle them (recovery of the metals). However, the regenerated catalysts are generally less active than the starting solids.

In order to overcome the shortfall in hydrodesulfurizing activity of the regenerated catalyst, it is possible to apply an additional "rejuvenation" treatment. The rejuvenation process consists in reimpregnating the regenerated catalyst with a solution containing metal precursors in the presence of organic or inorganic additives. These "rejuvenation" processes are well known to a person skilled in the art in the field of middle distillates. Many patents, such as, for example, U.S. Pat. Nos. 7,906,447, 8,722,558, 7,956,000, 7,820,579 or also CN102463127, thus provide different methods for carrying out the rejuvenation of the catalysts for the hydrotreating of middle distillates. The document US2017/036202 describes an increase in activity in a diesel hydrotreating process when a metal from group VIb and phosphorus are added to a regenerated catalyst. Catalysts for the hydrodesulfurization of middle distillates, which have high contents of metals in comparison with the catalysts for the selective hydrodesulfurization of gasolines, experience significant sintering during use and during regeneration. Thus, the rejuvenation treatments are focused on the dissolution and the redistribution of the metal phases in order to recover a dispersion close to the fresh catalyst and therefore an activity close to the fresh catalyst. Current methods for the rejuvenation of hydrotreating catalysts have been developed for restoring only the hydrodesulfurizing activity of the catalysts for the hydrodesulfurization of middle distillates and generally involve a regeneration stage before the rejuvenation proper.

Catalysts for the selective hydrodesulfurization of gasolines exhibit different rejuvenation issues from catalysts for the hydrotreating of gas oils, in particular due to the need to maintain the selective nature of the catalyst with respect to reactions for hydrodesulfurization and hydrogenation of olefins. This is because an increase in the selectivity is more desirable than an increase in or maintenance of the activity in the field of gasolines. There is thus a great advantage in developing a specific rejuvenation process for catalysts for the selective hydrodesulfurization of gasolines.

In order to provide a simple means of desulfurizing an olefinic gasoline while employing spent hydrotreating catalysts, U.S. Pat. No. 5,423,975 provides for the use of spent catalysts for the hydrotreating of residues potentially contaminated by metals, such as nickel and vanadium. This catalyst is neither regenerated nor rejuvenated. However, while this solution appears economically attractive, it is likely to come up against the problem of heterogeneity of the spent catalysts for the hydrotreating of residues, the contents of which of coke or of contaminants (metallic or other) can be very variable, which probably induces high variation in the performance qualities of the catalyst for the selective hydrodesulfurization of gasolines.

The document EP 1 447 436 describes a fresh partially coked catalyst which can be used in a process for the hydrodesulfurization of a catalytic cracking gasoline.

A rejuvenation process is described for a spent catalyst for the selective hydrodesulfurization of FCC gasolines in the patent CN105642312. This complex process employs, in addition to an organic agent, one or more metal additives containing at least one element chosen from Na, K, Mg, Ca, Cu and Zn; and a heat treatment with an atmosphere having the oxygen content controlled.

There thus exists today a keen interest among manufacturers and regenerators of catalysts, and refiners, for a process for the rejuvenation of hydrotreating catalysts, in particular catalysts for the hydrotreating of gasoline cuts, which exhibit catalytic performance qualities which are maintained in terms of catalytic activity in hydrodesulfurization and/or of selectivity and which thus, once employed, make it possible to produce a gasoline having a low sulfur content without severe reduction in the octane number.

The present invention thus relates to a "rejuvenation" process suitable for hydrotreating catalysts, the object of which is the maintenance of or a minimal loss in hydrodesulfurizing activity and the improvement in the selectivity, with respect to the fresh catalyst.

Subject Matters of the Invention

The invention relates to a process for the rejuvenation of an at least partially spent catalyst resulting from a hydrotreating process, said at least partially spent catalyst resulting from a fresh catalyst comprising at least one metal from group VIII, at least one metal from group VIb, an oxide support, and optionally phosphorus, said at least partially spent catalyst additionally comprising carbon in a content of between 2% and 20% by weight, with respect to the total weight of the at least partially spent catalyst, and sulfur in a content of between 1% and 8% by weight, with respect to the total weight of the at least partially spent catalyst, said process comprising the following stages:
  a) said at least partially spent catalyst is brought into contact with an impregnation solution containing a compound comprising a metal from group VIb,
  b) a drying stage is carried out at a temperature of less than 200° C. so as to obtain a rejuvenated catalyst.

This is because it has been observed that the rejuvenation process according to the invention makes it possible to obtain a rejuvenated catalyst showing an acceptable catalytic activity, compared with the use of the same fresh catalyst, and surprisingly induces an improvement in the selectivity in a process for the selective hydrodesulfurization of gasolines. Without being committed to any theory, it seems that the changes to the active phase caused by the rejuvenation of the at least partially spent catalyst induce a better selectivity toward the hydrodesulfurization reaction of the active sites.

Unlike the known rejuvenation processes, the process according to the invention does not require a regeneration stage before stage a). Regeneration stage is understood to mean a heat treatment carried out in a gas flow containing oxygen, generally air, carried out at a temperature of between 350° C. and 550° C., preferably of between 360° C. and 500° C. The at least partially spent catalyst is thus a catalyst which has not undergone a regeneration stage after its use in the hydrotreating process. The rejuvenation stage a) is thus carried out on an at least partially spent catalyst which is not regenerated.

According to one alternative form, the molar ratio of the metal from group VIb added per metal from group VIb already present in the at least partially spent catalyst is between 0.15 and 2.5 mol/mol.

According to one alternative form, in stage a), the impregnation solution additionally contains a compound comprising a metal from group VIII; the molar ratio of the metal from group VIII added per metal from group VIII already present in the at least partially spent catalyst is between 0.1 and 2.5 mol/mol.

According to one alternative form, in stage a), the impregnation solution additionally contains phosphorus; the molar ratio of the phosphorus added per metal from group VIb already present in the at least partially spent catalyst is between 0.1 and 2.5 mol/mol.

According to one alternative form, in stage a), the impregnation solution additionally contains an organic compound containing oxygen and/or nitrogen and/or sulfur; the molar ratio of the organic compound added per metal from group VIb already present in the at least partially spent catalyst is between 0.01 and 5 mol/mol.

According to one alternative form, the organic compound containing oxygen and/or nitrogen and/or sulfur is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea or amide functional group or also compounds including a furan ring or also sugars.

According to one alternative form, the organic compound containing oxygen and/or nitrogen and/or sulfur is chosen from γ-valerolactone, 2-acetylbutyrolactone, triethylene glycol, diethylene glycol, ethylene glycol, ethylenediaminetetraacetic acid, maleic acid, malonic acid, citric acid, gluconic acid, di($C_1$-$C_4$ alkyl) succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

According to one alternative form, in stage a), the impregnation solution comprises a water-ethanol or water-methanol mixture.

According to one alternative form, the rejuvenation stage a) is preceded by a deoiling stage which comprises bringing the at least partially spent catalyst into contact with a stream of inert gas at a temperature of between 300° C. and 400° C.

According to one alternative form, the fresh catalyst has a content of metal from group VIb of between 1% and 40% by weight of oxide of said metal from group VIb, with respect to the total weight of the catalyst.

According to one alternative form, the fresh catalyst has a content of metal from group VIII of between 0.1% and 10% by weight of oxide of said metal from group VIII, with respect to the total weight of the catalyst.

According to one alternative form, the fresh catalyst has a phosphorus content of between 0.3% and 10% by weight, expressed as $P_2O_5$, with respect to the total weight of the catalyst and the phosphorus/(metal from group VIb) molar ratio in the catalyst is between 0.1 and 0.7.

According to one alternative form, the oxide support of the fresh catalyst is chosen from aluminas, silica, silica-aluminas or also titanium or magnesium oxides, used alone or as a mixture with alumina or silica-alumina.

According to one alternative form, the at least partially spent catalyst results from a process for the selective hydrodesulfurization of a sulfur-containing olefinic gasoline cut.

The present invention also relates to a process for the hydrodesulfurization of a sulfur-containing olefinic gasoline cut in which said gasoline cut, hydrogen and the catalyst rejuvenated according to the process of the invention are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l.

According to one alternative form, the rejuvenated catalyst is subjected to a sulfidation stage before or during the hydrodesulfurization process.

According to one alternative form, the hydrodesulfurization process is carried out in a catalytic bed of a reactor of the fixed bed type containing several catalytic beds; at least one other catalytic bed upstream or downstream of the catalytic bed containing the rejuvenated catalyst in the direction of the circulation of the feedstock contains at least in part a fresh catalyst and/or a regenerated catalyst.

According to one alternative form, the hydrodesulfurization process is carried out in at least two reactors in series of the fixed bed type or of the ebullated bed type; at least one of the reactors contains a rejuvenated catalyst while another reactor contains a fresh catalyst or a regenerated catalyst, or a mixture of a rejuvenated catalyst and of a fresh and/or regenerated catalyst, in any order, with or without removal of at least a part of the $H_2S$ from the effluent resulting from the first reactor before treating said effluent in the second reactor.

Subsequently, the groups of chemical elements are given according to the CAS classification (CRC Handbook of Chemistry and Physics, published by CRC Press, editor D. R. Lide, 81$^{st}$ edition, 2000-2001). For example, group VIII according to the CAS classification corresponds to the metals from columns 8, 9 and 10 according to the new IUPAC classification.

DESCRIPTION OF THE INVENTION

The rejuvenated catalyst obtained by the process according to the invention results from an at least partially spent catalyst, itself resulting from a fresh catalyst, which has been used in a hydrotreating process for a certain period of time and which exhibits a significantly lower activity than the fresh catalyst, which necessitates its replacement.

The at least partially spent catalyst can result from a hydrotreating of any petroleum cut, such as a naphtha, kerosene, gas oil, vacuum distillate or residue cut. Hydrotreating is understood to mean reactions encompassing in particular hydrodesulfurization (HDS), hydrodenitrogenation (HDN) and hydrogenation of aromatics (HOA). It can also result from a hydrotreating of biomass or bio-oils.

Preferably, the at least partially spent catalyst results from a process for the hydrodesulfurization of a sulfur-containing olefinic gasoline cut, carried out under the conditions as described below.

The fresh catalyst used in a hydrotreating process is known to a person skilled in the art. It comprises at least one metal from group VIII, at least one metal from group VIb, an oxide support and optionally phosphorus and/or an organic compound. According to another alternative form, the fresh catalyst does not comprise phosphorus.

The preparation of the fresh catalyst is known and generally comprises a stage of impregnation of the metals from group VIII and from group VIb and optionally of phosphorus and/or of the organic compound on the oxide support, followed by a drying operation, then by an optional calcination making it possible to obtain the active phase in their oxide forms. Before its use in a process for the hydrodesulfurization of a sulfur-containing olefinic gasoline cut, the fresh catalyst is generally subjected to a sulfidation in order to form the active entity as described below.

According to an alternative form of the invention, the fresh catalyst has not undergone calcination during its preparation, that is to say that the impregnated catalytic precursor has not been subjected to a stage of heat treatment at a temperature of greater than 200° C. under an inert atmosphere or under an oxygen-containing atmosphere, in the presence or absence of water.

According to another alternative form of the invention, the fresh catalyst has undergone a calcination stage during its preparation, that is to say that the impregnated catalytic precursor has been subjected to a stage of heat treatment at a temperature of between 200° C. and 1000° C. and preferably between 250° C. and 750° C., for a period of time typically of between 15 minutes and 10 hours, under an inert atmosphere or under an oxygen-containing atmosphere, in the presence or absence of water.

The metal from group VIb present in the active phase of the fresh catalyst is preferentially chosen from molybdenum and tungsten. The metal from group VIII present in the active phase of the fresh catalyst is preferentially chosen from cobalt, nickel and the mixture of these two elements. The active phase of the fresh catalyst is preferably chosen from the group formed by the combination of the elements nickel-molybdenum, cobalt-molybdenum and nickel-cobalt-molybdenum and very preferably the active phase consists of cobalt and molybdenum.

The content of metal from group VIII is between 0.1% and 10% by weight of oxide of the metal from group VIII, with respect to the total weight of the fresh catalyst, preferably of between 0.6% and 8% by weight, preferably of between 2% and 7%, very preferably of between 2% and 6% by weight and more preferably still of between 2.5% and 6% by weight.

The content of metal from group VIb is between 1% and 40% by weight of oxide of the metal from group VIb, with respect to the total weight of the fresh catalyst, preferably of between 1% and 25% by weight, very preferably of between 2% and 18% by weight.

The metal from group VIII to metal from group VIb molar ratio of the at least partially spent catalyst is generally between 0.1 and 0.8, preferably between 0.2 and 0.6.

In addition, the fresh catalyst exhibits a density of metal from group VIb, expressed as number of atoms of said metal per unit area of the catalyst, which is between 0.5 and 30 atoms of metal from group VIb per $nm^2$ of catalyst, preferably between 2 and 25, more preferably still between 3 and 15. The density of metal from group VIb, expressed as number of atoms of metal from group VIb per unit area of the catalyst (number of atoms of metal from group VIb per nm² of catalyst), is calculated, for example, from the following relationship:

$$d(\text{metal from group } VIB) = \frac{(X \times N_A)}{(100 \times 10^{18} \times S \times M_M)}$$

with:
X=% by weight of metal from group VIb;
$N_A$=Avogadro's number, equal to $6.022 \times 10^{23}$;
S=Specific surface of the catalyst (m²/g), measured according to the standard ASTM D3663;
$M_M$=Molar mass of the metal from group VIb (for example 95.94 g/mol for molybdenum).

For example, if the catalyst contains 20% by weight of molybdenum oxide MoO₃ (i.e. 13.33% by weight of Mo) and has a specific surface of 100 m²/g, the density d(Mo) is equal to:

$$d\text{ Mo} = \frac{(13.33 \times N_A)}{(100 \times 10^{18} \times 100 \times 96)} = 8.4 \text{ atoms of Mo/nm}^2 \text{ of catalyst}$$

Optionally, the fresh catalyst can additionally exhibit a phosphorus content generally of between 0.3% and 10% by weight of P₂O₅, with respect to the total weight of the fresh catalyst, preferably between 0.5% and 5% by weight, very preferably between 1% and 3% by weight. For example, the phosphorus present in the fresh catalyst is combined with the metal from group VIb and optionally also with the metal from group VIII in the form of heteropolyanions.

Furthermore, the phosphorus/(metal from group VIb) molar ratio is generally between 0.1 and 0.7 when phosphorus is present.

Preferably, the fresh catalyst is characterized by a specific surface of between 5 and 400 m²/g, preferably of between 10 and 250 m²/g, preferably of between 20 and 200 m²/g, very preferably of between 30 and 180 m²/g. The specific surface is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model device of the Micromeritics™ brand.

The pore volume of the fresh catalyst is generally between 0.4 cm³/g and 1.3 cm³/g, preferably between 0.6 cm³/g and 1.1 cm³/g. The total pore volume is measured by mercury porosimetry according to the standard ASTM D4284 with a wetting angle of 140°, as described in the same work.

The tapped bulk density (TBD) of the fresh catalyst is generally between 0.4 and 0.7 g/ml, preferably between 0.45 and 0.69 g/ml. The TBD measurement consists in introducing the catalyst into a measuring cylinder, the volume of which has been determined beforehand, and then, by vibration, in tapping it until a constant volume is obtained. The bulk density of the tapped product is calculated by comparing the mass introduced and the volume occupied after tapping.

The fresh catalyst can be in the form of cylindrical or multilobe (trilobe, quadrilobe, and the like) extrudates with a small diameter, or of spheres.

The oxide support of the fresh catalyst is usually a porous solid chosen from the group consisting of: aluminas, silica, silica-aluminas and also titanium and magnesium oxides, used alone or as a mixture with alumina or silica-alumina. It is preferably chosen from the group consisting of silica, the family of the transition aluminas and silica-aluminas; very preferably, the oxide support is constituted essentially of at least one transition alumina, that is to say that it comprises at least 51% by weight, preferably at least 60% by weight, very preferably at least 80% by weight, indeed even at least 90% by weight, of transition alumina. It preferably consists solely of a transition alumina. Preferably, the oxide support of the fresh catalyst is a "high temperature" transition alumina, that is to say which contains theta-, delta-, kappa- or alpha-phase aluminas, alone or as a mixture, and an amount of less than 20% of gamma-, chi- or eta-phase alumina.

The fresh catalyst can also additionally comprise at least one organic compound containing oxygen and/or nitrogen and/or sulfur before sulfidation. Such additives are described subsequently.

During the hydrotreating process, coke and sulfur as well as other contaminants resulting from the feedstock, such as silicon, arsenic or chlorine, are formed and/or deposited on the catalyst and transform the fresh catalyst into an at least partially spent catalyst.

The at least partially spent catalyst is thus composed of the oxide support and of the active phase formed of at least one metal from group VIb and of at least one metal from group VIII and optionally of the phosphorus from the fresh catalyst, as well as carbon, sulfur and optionally other contaminants resulting from the feedstock, such as silicon, arsenic and chlorine.

The contents of metal from group VIb, of metal from group VIII and of phosphorus in the fresh, at least partially spent or rejuvenated catalyst are expressed as oxides after correction for the loss on ignition of the catalyst sample in a muffle furnace for two hours at 550° C. The loss on ignition is due to the loss of moisture, carbon, sulfur and/or other contaminants. It is determined according to ASTM D7348.

The contents of metal from group VIb, of metal from group VIII and optionally of phosphorus in the at least partially spent catalyst are substantially identical to the contents of the fresh catalyst from which it results.

An at least partially spent catalyst is understood to mean a catalyst which exits from a hydrotreating process, and preferably which exits from a process for the hydrodesulfurization of a sulfur-containing olefinic gasoline cut carried out under the conditions as described below, and which has not undergone regeneration, that is to say a heat treatment under a gas containing air or oxygen at a temperature of greater than 200° C. It may have undergone a deoiling.

It will be noted that the term "coke" or "carbon" in the present patent application denotes a substance based on hydrocarbons which is deposited on the surface of the catalyst during its use, which is highly cyclized and condensed and which has an appearance similar to graphite.

The at least partially spent catalyst contains in particular carbon at a content generally of greater than or equal to 2% by weight, preferably of between 2% and 25% by weight and more preferably still of between 5% and 16% by weight, with respect to the total weight of the at least partially spent catalyst. This carbon content is measured by elemental analysis according to ASTM D5373.

The at least partially spent catalyst contains sulfur (before the optional sulfidation) at a content of between 1% and 8% by weight, with respect to the total weight of the at least partially spent catalyst, preferentially of between 1% and 6% by weight and particularly preferably between 2% and 5% by weight. This residual sulfur content in the regenerated hydrotreating catalyst is measured by elemental analysis according to ASTM D5373.

Optionally, the at least partially spent catalyst can additionally exhibit a low content of contaminants resulting from the feedstock treated by the fresh catalyst from which it originates, such as silicon, arsenic or chlorine.

Preferably, the content of silicon (besides that possibly present on the fresh catalyst) is less than 2% by weight and very preferably less than 1% by weight, with respect to the total weight of the at least partially spent catalyst.

Preferably, the arsenic content is less than 2000 ppm by weight and very preferably less than 500 ppm by weight, with respect to the total weight of the at least partially spent catalyst.

Preferably, the chlorine content is less than 2000 ppm by weight and very preferably less than 500 ppm by weight, with respect to the total weight of the at least partially spent catalyst.

Deoiling (Optional Stage)

The rejuvenation stage a) is preferably preceded by a deoiling stage. The deoiling stage generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 $SI \cdot I^{-1} \cdot h^{-1}$ for 3 to 7 hours.

In an alternative form, the deoiling stage can be carried out by light hydrocarbons, by steam treatment or any other analogous process.

The deoiling stage makes it possible to remove the soluble hydrocarbons and thus to release the porosity of the at least partially spent catalyst necessary for the rejuvenation.

Rejuvenation (Stage a)

The rejuvenation process according to the invention comprises, after the optional deoiling stage, a rejuvenation stage a) according to which said at least partially spent catalyst is brought into contact with an impregnation solution containing a compound comprising a metal from group VIb.

Preferably, the molar ratio of the metal from group VIb added per metal from group VIb already present in the at least partially spent catalyst is between 0.15 and 2.5 mol/mol, preferably between 0.2 and 2.0 mol/mol and more preferably still between 0.3 and 1.0 mol/mol.

This is because, during the use of the catalyst in the hydrotreating process, the pores of the catalyst become blocked over time and the active phase containing the metals becomes increasingly inaccessible. A decrease in the catalytic activity is thus observed. In order to overcome the deficit in hydrodesulfurizing activity of the at least partially spent catalyst, it is possible to reimpregnate the catalyst with a solution containing a compound comprising a metal from group VIb and optionally also a compound comprising a metal from group VIII and/or phosphorus in order to limit the drop in activity and, surprisingly, to increase the selectivity.

According to a first alternative form, the rejuvenation stage a) can also comprise bringing the at least partially spent catalyst into contact with an impregnation solution containing a compound comprising a metal from group VIII, in addition to the compound comprising a metal from group VIb.

In this case, the molar ratio of the metal from group VIII added per metal from group VIII already present in the at least partially spent catalyst is between 0.1 and 2.5 mol/mol, preferably between 0.1 and 2.0 mol/mol and more preferably still between 0.1 and 1.0 mol/mol.

According to a preferred alternative form of this first alternative form, the impregnation solution contains only the compound(s) comprising a metal from group VIb and the compound(s) comprising a metal from group VIII, in addition to the solvent(s).

The metal from group VIb introduced is preferentially chosen from molybdenum and tungsten. The metal from group VIII introduced is preferentially chosen from cobalt, nickel and the mixture of these two elements. Preferably, the combination of the elements nickel-molybdenum, cobalt-molybdenum and nickel-cobalt-molybdenum and very preferably the cobalt-molybdenum combination is chosen.

By way of example, use may be made, among the sources of molybdenum, of the oxides and hydroxides, molybdic acids and their salts, in particular the ammonium salts, such as ammonium molybdate, ammonium heptmolybdate, phosphomolybdic acid ($H_3PMo_{12}O_{40}$), and their salts, and optionally silicomolybdic acid ($H_4SiMo_{12}O_{40}$) and its salts. The sources of molybdenum can also be any heteropolycompound of Keggin, Iacunary Keggin, substituted Keggin, Dawson, Anderson or Strandberg type, for example. Use is preferably made of molybdenum trioxide and the heteropolycompounds of Keggin, Iacunary Keggin, substituted Keggin and Strandberg type.

The tungsten precursors which can be used are also well known to a person skilled in the art. For example, use may be made, among the sources of tungsten, of the oxides and hydroxides, tungstic acids and their salts, in particular the ammonium salts such as ammonium tungstate, ammonium metatungstate, phosphotungstic acid and their salts, and optionally silicotungstic acid ($H_4SiW_{12}O_{40}$) and its salts. The sources of tungsten can also be any heteropolycompound of Keggin, Iacunary Keggin, substituted Keggin or Dawson type, for example. Use is preferably made of the oxides and the ammonium salts, such as ammonium metatungstate or the heteropolyanions of Keggin, Iacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

Any impregnation solution described in the present invention can comprise any polar protic solvent known to a person skilled in the art. Preferably, use is made of a polar protic solvent, for example chosen from the group formed by methanol, ethanol and water. Preferably, the impregnation solution comprises a water-ethanol or water-methanol mixture as solvents in order to facilitate the impregnation of the compound containing a metal from group VIb (and optionally of the compound containing a metal from group VIII and/or of the phosphorus and/or of the organic compound) on the at least partially spent catalyst containing coke and which is thus in part hydrophobic. Preferably, the solvent used in the impregnation solution consists of a water-ethanol or water-methanol mixture.

According to a second alternative form, the rejuvenation stage a) can also comprise bringing the at least partially spent catalyst into contact with an impregnation solution containing phosphorus, in addition to the compound comprising a metal from group VIb and optionally to the compound comprising a metal from group VIII.

In this case, the molar ratio of the phosphorus added per metal from group VIb already present in the at least partially spent catalyst is between 0.1 and 2.5 mol/mol, preferably between 0.1 and 2.0 mol/mol and more preferably still between 0.1 and 1.0 mol/mol.

According to a preferred alternative form of this second alternative form, the impregnation solution contains only the compound(s) comprising a metal from group VIb and the compound(s) comprising a metal from group VIII and the phosphorus, preferably in the form of phosphoric acid, in addition to the solvent(s).

The preferred phosphorus precursor is orthophosphoric acid $H_3PO_4$, but its salts and esters, such as ammonium phosphates, are also suitable. The phosphorus can also be introduced at the same time as the element(s) from group VIb in the form of Keggin, lacunary Keggin, substituted Keggin or Strandberg-type heteropolyanions.

Stage a) of bringing said at least partially spent and optionally deoiled catalyst into contact with an impregnation solution containing a compound comprising a metal from group VIb and optionally a compound comprising a metal from group VIII and/or phosphorus can be carried out either by slurry impregnation, or by excess impregnation, or by dry impregnation, or by any other means known to a person skilled in the art.

Equilibrium (or excess) impregnation consists in immersing the support or the catalyst in a volume of solution (often considerably) greater than the pore volume of the support or of the catalyst while keeping the system stirred in order to improve the exchanges between the solution and the support or catalyst. An equilibrium is finally reached after diffusion of the different entities into the pores of the support or catalyst. Control of the amount of elements deposited is provided by the prior measurement of an adsorption isotherm which relates the concentration of the elements to be deposited contained in the solution to the amount of the elements deposited on the solid in equilibrium with this solution.

Dry impregnation consists, for its part, in introducing a volume of impregnation solution equal to the pore volume of the support or of the catalyst. Dry impregnation makes it possible to deposit, on a given support or catalyst, all of the metals and additives contained in the impregnation solution.

Stage a) can advantageously be carried out by one or more excess impregnations of solution or preferably by one or more dry impregnations and very preferably by a single dry impregnation of said at least partially spent catalyst, using the impregnation solution.

According to a third alternative form, the rejuvenation stage a) can also comprise bringing the at least partially spent catalyst into contact with an impregnation solution containing an organic compound containing oxygen and/or nitrogen and/or sulfur, in addition to the compound comprising a metal from group VIb and optionally to the compound comprising a metal from group VIII and/or to the phosphorus. The function of the additives or organic compounds is to increase the catalytic activity in comparison with the catalysts without additives. Said organic compound is preferentially impregnated on said catalyst after dissolution in aqueous or nonaqueous solution.

In this case, the molar ratio of the organic compound added per metal from group VIb already present in the at least partially spent catalyst is between 0.01 and 5 mol/mol, preferably between 0.05 and 3 mol/mol, in a preferred way between 0.05 and 2 mol/mol and very preferably between 0.1 and 1.5 mol/mol.

When several organic compounds are present, the different molar ratios apply for each of the organic compounds present.

According to a preferred alternative form of this third alternative form, the impregnation solution contains only the compound(s) comprising a metal from group VIb, the compound(s) comprising a metal from group VIII, the phosphorus, preferably in the form of phosphoric acid, and the organic compound(s), in addition to the solvent(s).

Generally, the organic compound is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea and amide functional group or also compounds including a furan ring or also sugars.

The oxygen-containing organic compound can be one or more chosen from compounds comprising one or more chemical functional groups chosen from a carboxylic, alcohol, ether, aldehyde, ketone, ester or carbonate functional group or also compounds including a furan ring or also sugars. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known as furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate and 5-methyl-2(3H)-furanone.

The nitrogen-containing organic compound can be one or more chosen from compounds comprising one or more chemical functional groups chosen from an amine or nitrile functional group. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The organic compound containing oxygen and nitrogen can be one or more chosen from compounds comprising one or more chemical functional groups chosen from a carboxylic, alcohol, ether, aldehyde, ketone, ester, carbonate, amine, nitrile, imide, amide, urea or oxime functional group. By way of example, the organic compound containing oxygen and nitrogen can be one or more choose from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, methyl 3-(methylthio)propanoate and ethyl 3-(methylthio)propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, dimethyl succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

The contacting stage a) comprises several embodiments. They are distinguished in particular by the moment of the introduction of the organic compound when it is present and which can be carried out either at the same time as the impregnation of the compound comprising a metal from group VIb (coimpregnation), or after (postimpregnation), or before (preimpregnation). In addition, it is possible to combine the embodiments.

Advantageously, after each impregnation stage, the impregnated support is left to mature. Maturation makes it possible for the impregnation solution to homogeneously disperse within the support.

Any maturation stage described in the present invention is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and six hours is sufficient.

Drying (Stage b)

In accordance with the drying stage b) of the rejuvenation process according to the invention, the rejuvenated catalyst obtained in stage a) is subjected to a drying stage at a temperature of less than 200° C., advantageously of between 50° C. and 180° C., preferably between 70° C. and 150° C., very preferably between 75° C. and 130° C., without subsequent calcination.

The drying stage is preferentially carried out under an inert atmosphere or under an oxygen-containing atmosphere.

The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or of air. Preferably, the drying stage has a duration of between 5 minutes and 15 hours, preferably between 30 minutes and 12 hours.

According to a first alternative form and advantageously when an organic compound is present, the drying is carried out so as to preferably retain at least 30% by weight of the organic compound introduced during an impregnation stage; preferably, this amount is greater than 50% by weight and more preferably still greater than 70% by weight, calculated on the basis of the carbon remaining on the rejuvenated catalyst.

The catalyst resulting from stage b) is not subsequently subjected to a calcination. Calcination is understood to mean a heat treatment under a gas containing air or oxygen at a temperature of greater than 200° C.

At the end of the drying stage b), a rejuvenated catalyst is then obtained, which catalyst will be subjected to an optional activation (sulfidation) stage for its subsequent use in a process for the hydrodesulfurization of gasolines.

Sulfidation (Optional Stage)

Before bringing into contact with the feedstock to be treated in a process for the hydrodesulfurization of gasolines, the rejuvenated catalyst of the process according to the invention generally undergoes a sulfidation stage. The sulfidation is preferably carried out in a sulforeducing medium, that is to say in the presence of $H_2S$ and hydrogen, in order to transform metal oxides into sulfides, such as, for example, $MoS_2$ and $Co_9S_8$. The sulfidation is carried out by injecting, onto the catalyst, a stream containing $H_2S$ and hydrogen, or else a sulfur compound capable of decomposing to give $H_2S$ in the presence of the catalyst and of hydrogen. Polysulfides, such as dimethyl disulfide (DMDS), are $H_2S$ precursors commonly used to sulfide catalysts. The sulfur can also originate from the feedstock. The temperature is adjusted in order for the $H_2S$ to react with the metal oxides to form metal sulfides. This sulfidation can be carried out in situ or ex situ (inside or outside the reactor) of the reactor of the process according to the invention at temperatures of between 200° C. and 600° C. and more preferentially between 300° C. and 500° C.

Hydrodesulfurization Process

The present invention also relates to a process for the hydrodesulfurization of a sulfur-containing olefinic gasoline cut in which said gasoline cut, hydrogen and the catalyst rejuvenated according to the process of the invention are brought into contact, said hydrodesulfurization process being carried out at a temperature of between 200° C. and 400° C., preferably of between 230° C. and 330° C., a total pressure of between 1 and 3 MPa, preferably of between 1.5 and 2.5 MPa, an hourly space velocity (HSV), defined as being the flow rate by volume of feedstock relative to the volume of catalyst, of between 1 and 10 $h^{-1}$, preferably of between 2 and 6 $h^{-1}$, and a hydrogen/gasoline feedstock ratio by volume of between 100 and 1200 Sl/l, preferably of between 150 and 400 Sl/l.

The hydrodesulfurization process according to the invention makes it possible to transform the organosulfur compounds of a gasoline cut into hydrogen sulfide ($H_2S$) while limiting as much as possible the hydrogenation of the olefins present in said cut.

Feedstock to be Treated

The process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is a sulfur-containing olefinic gasoline cut, the boiling point range of which typically extends from the boiling points of the hydrocarbons having 2 or 3 carbon atoms (C2 or C3) up to 260° C., preferably from the boiling points of the hydrocarbons having 2 or 3 carbon atoms (C2 or C3) up to 220° C., more preferably from the boiling points of the hydrocarbons having 5 carbon atoms up to 220° C. The process according to the invention can also treat feedstocks having lower end points than those mentioned above, such as, for example, a C5-180° C. cut.

The sulfur content of the gasoline cuts produced by catalytic cracking (FCC) depends on the sulfur content of the feedstock treated by the FCC, the presence or not of a pretreatment of the feedstock of the FCC, as well as on the end point of the cut. Generally, the sulfur contents of the whole of a gasoline cut, in particular those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, generally less than 300 ppm of which of mercaptans. The mercaptans are generally concentrated in the light fractions of the gasoline and more specifically in the fraction, the boiling point of which is less than 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation stage aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation stage described below before the distillation stage.

The hydrodesulfurization process can be carried out in one or more reactors in series of the fixed bed type or of the ebullated bed type. If the process is carried out by means of at least two reactors in series, it is possible to provide a device for the removal of the $H_2S$ from the effluent resulting from the first hydrodesulfurization reactor before treating said effluent in the second hydrodesulfurization reactor.

The hydrodesulfurization process according to the invention is carried out in the presence of a rejuvenated catalyst. It can also be carried out in the presence of a mixture of a rejuvenated catalyst and of a fresh catalyst or of a regenerated catalyst.

When the fresh or regenerated catalyst is present, it comprises at least one metal from group VIII, at least one metal from group VIb and an oxide support, and optionally phosphorus and/or an organic compound such as are described above.

The active phase and the support of the fresh or regenerated catalyst may or may not be identical to the active phase and to the support of the rejuvenated catalyst.

The active phase and the support of the fresh catalyst may or may not be identical to the active phase and to the support of the regenerated catalyst.

When the hydrodesulfurization process is carried out in the presence of a rejuvenated catalyst and of a fresh or regenerated catalyst, it can be carried out in a reactor of the fixed bed type containing several catalytic beds.

In this case, and according to a first alternative form, a catalytic bed containing the fresh or regenerated catalyst can precede a catalytic bed containing the rejuvenated catalyst in the direction of the circulation of the feedstock.

In this case, and according to a second alternative form, a catalytic bed containing the rejuvenated catalyst can precede a catalytic bed containing the fresh or regenerated catalyst in the direction of the circulation of the feedstock.

In this case, and according to a third alternative form, a catalytic bed can contain a mixture of a rejuvenated catalyst and of a fresh catalyst and/or of a regenerated catalyst.

In these cases, the operating conditions are those described above. They are generally identical in the different catalytic beds except for the temperature, which generally increases in a catalytic bed following the exothermicity of the hydrodesulfurization reactions.

When the hydrodesulfurization process is carried out in the presence of a rejuvenated catalyst and of a fresh or regenerated catalyst in several reactors in series of the fixed bed type or of the ebullated bed type, one reactor can comprise a rejuvenated catalyst while another reactor can comprise a fresh or regenerated catalyst, or a mixture of a rejuvenated catalyst and of a fresh and/or regenerated catalyst, and this in any order. It is possible to provide a device for the removal of the $H_2S$ from the effluent resulting from the first hydrodesulfurization reactor before treating said effluent in the second hydrodesulfurization reactor. In these cases, the operating conditions are those described above and may or may not be identical in the different reactors.

Selective Hydrogenation (Optional Stage)

According to one alternative form, the gasoline cut is subjected to a selective hydrogenation stage before the hydrodesulfurization process according to the invention.

Preferably, the gasoline treated by the hydrodesulfurization process according to the invention is a heavy gasoline resulting from a distillation stage aimed at separating a broad cut of the gasoline resulting from a cracking process (or FRCN for Full Range Cracked Naphtha) into a light gasoline and a heavy gasoline.

Advantageously, the broad cut FRCN is subjected to a selective hydrogenation stage described below before the distillation stage.

Said FRCN cut is treated beforehand in the presence of hydrogen and of a selective hydrogenation catalyst so as to at least partially hydrogenate the diolefins and to carry out a reaction for increasing the molecular weight of a part of the mercaptan (RSH) compounds present in the feedstock to give thioethers, by reaction with olefins.

To this end, the broad FRCN cut is sent to a selective hydrogenation catalytic reactor containing at least one fixed or moving bed of catalyst for the selective hydrogenation of the diolefins and for increasing the molecular weight of the mercaptans. The reaction for the selective hydrogenation of the diolefins and for increasing the molecular weight of the mercaptans is preferentially carried out on a sulfided catalyst comprising at least one element from group VIII and optionally at least one element from group VIb and an oxide support. The element from group VIII is preferably chosen from nickel and cobalt and in particular nickel. The element from group VIb, when it is present, is preferably chosen from molybdenum and tungsten and very preferably molybdenum.

The oxide support of the catalyst is preferably chosen from alumina, nickel aluminate, silica, silicon carbide or a mixture of these oxides. Use is preferably made of alumina and more preferably still of high-purity alumina. According to a preferred embodiment, the selective hydrogenation catalyst contains nickel at a content by weight of nickel oxide (in NiO form) of between 1% and 12%, and molybdenum at a content by weight of molybdenum oxide (in $MoO_3$ form) of between 6% and 18% and a nickel/molybdenum molar ratio of between 0.3 and 2.5, the metals being deposited on a support consisting of alumina and for which the degree of sulfidation of the metals constituting the catalyst being greater than 50%.

During the optional selective hydrogenation stage, gasoline is brought into contact with the catalyst at a temperature of between 50° C. and 250° C., preferably between 80° C. and 220° C. and more preferably still between 90° C. and 200° C., with a liquid space velocity (LHSV) of between 0.5 $h^{-1}$ and 20 $h^{-1}$, the unit of the liquid space velocity being the liter of feedstock per liter of catalyst and per hour (l/l·h). The pressure is between 0.4 MPa and 5 MPa, preferably between 0.6 and 4 MPa and more preferably still between 1 and 2 MPa. The optional selective hydrogenation stage is typically carried out with a $H_2$/gasoline feedstock ratio of between 2 and 100 $Sm^3$ of hydrogen per $m^3$ of feedstock, preferably between 3 and 30 $Sm^3$ of hydrogen per $m^3$ of feedstock.

EXAMPLES

Example 1—Preparation of a Fresh Calcined CoMo Catalyst A1 (Comparative)

The support of the catalyst A1 is a transition alumina with a specific surface of 140 $m^2$/g and a pore volume of 1.0 $cm^3$/g. The catalyst A1 is prepared by dry impregnation of the support with an aqueous solution of ammonium heptamolybdate and of cobalt nitrate, the volume of the solution containing the precursors of the metals being strictly equal to the pore volume of the mass of alumina support. The concentration of the metal precursors in aqueous solution is adjusted so as to obtain the desired percentage by weight of molybdenum and cobalt on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst A1 obtained after calcination has a content of 9.2% by weight of molybdenum ($MoO_3$ equivalent) and 2.5% by weight of cobalt (CoO equivalent). This catalyst exhibits a Co/Mo atomic ratio of 0.52 and a specific surface of 124 $m^2$/g.

Example 2—Preparation of a Rejuvenated Catalyst A2 by Addition of Co and Mo (According to the Invention)

The fresh catalyst A1 is used to desulfurize a catalytic cracking (FCC) gasoline, the characteristics of which are collated in table 1. The reaction is carried out at 270° C. for 900 hours in a reactor of traversed bed type under the following conditions: P=2 MPa, HSV=4 $h^{-1}$, $H_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

TABLE 1

| | |
|---|---|
| S ppm | 392 |
| Aromatics wt % | 41.3 |
| Paraffins wt % | 27.2 |
| Naphthenics wt % | 11.0 |
| Olefins wt % | 20.5 |
| T5° C. | 62 |
| T95° C. | 225 |

The spent catalyst A1 is withdrawn from the reactor on conclusion of the hydrodesulfurization of a catalytic cracking (FCC) gasoline described above. The spent catalyst A1 is subsequently washed with toluene in a Soxhlet at 250° C. for 7 hours (deoiling). Its residual carbon and sulfur contents are 2.6% by weight and 4.3% by weight respectively.

The catalyst A2 is prepared by dry impregnation of the spent catalyst A1 with an aqueous solution of ammonium heptamolybdate and of cobalt nitrate, the volume of the solution containing the precursors of the metals being strictly equal to the pore volume of the mass of the spent catalyst A1. The concentration of the metal precursors in aqueous solution is adjusted so as to obtain the desired percentage by weight of molybdenum and cobalt on the final catalyst. After dry impregnation on the spent catalyst A1, the catalyst A2 is left to mature for 1 h 30 in a water-saturated chamber and then dried under air in an oven at 90° C. for 12 hours.

The catalyst A2 obtained after drying has a content of 13.8% by weight of molybdenum ($MoO_3$ equivalent) and 3.6% by weight of cobalt (CoO equivalent), a Co/Mo atomic ratio of 0.50 and a specific surface of 113 $m^2$/g. The molar ratio of the metal from group VIb added per metal from group VIb already present in the spent catalyst A1 is 0.5 mol/mol.

Example 3—Preparation of a Rejuvenated Catalyst A3 by Addition of Co, Mo and P (According to the Invention)

The fresh catalyst A1 is used to desulfurize a catalytic cracking (FCC) gasoline, the characteristics of which are collated in table 1. The reaction is carried out at 270° C. for 1400 hours in a reactor of traversed bed type under the following conditions: P=2 MPa, HSV=4 h$^{-1}$, H$_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst A1 is withdrawn from the reactor on conclusion of the hydrodesulfurization of a catalytic cracking (FCC) gasoline described above in table 1. The spent catalyst A1 is subsequently washed with toluene in a Soxhlet at 250° C. for 7 hours. Its residual carbon and sulfur contents are 3.0% by weight and 4.2% by weight respectively. Its specific surface is 120 m$^2$/g.

The catalyst A3 is prepared by dry impregnation of the spent catalyst A1 with an aqueous solution of molybdenum oxide, of cobalt hydroxide and of orthophosphoric acid, the volume of the solution containing the precursors of the metals being strictly equal to the pore volume of the mass of the spent catalyst A1. The concentration of the metal precursors in aqueous solution is adjusted so as to obtain the desired percentage by weight of molybdenum, cobalt and phosphorus on the final catalyst. After dry impregnation on the spent catalyst A1, the catalyst A3 is left to mature for 1 h 30 in a water-saturated chamber and dried under air in an oven at 120° C. for 12 hours.

The catalyst A3 obtained after drying has a content of 13.8% by weight of molybdenum (MoO$_3$ equivalent), 3.6% by weight of cobalt (CoO equivalent) and 1.3% by weight of phosphorus (P$_2$O$_5$ equivalent), a Co/Mo atomic ratio of 0.50, a P/Mo atomic ratio of 0.19 and a specific surface of 110 m$^2$/g. The molar ratio of the metal from group VIb added per metal from group VIb already present in the spent catalyst A1 is 0.5 mol/mol.

Example 4—Preparation of a Rejuvenated Catalyst A4 by Addition of Co, Mo, P and Citric Acid (According to the Invention)

The fresh catalyst A1 is used to desulfurize a catalytic cracking (FCC) gasoline, the characteristics of which are collated in table 1. The reaction is carried out at 270° C. for 1600 hours in a reactor of traversed bed type under the following conditions: P=2 MPa, HSV=4 h$^{-1}$, H$_2$/HC=360 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst A1 is withdrawn from the reactor on conclusion of the hydrodesulfurization of a catalytic cracking (FCC) gasoline described above in table 1. The spent catalyst A1 is subsequently washed with toluene in a Soxhlet at 250° C. for 7 hours. Its residual carbon and sulfur contents are 2.4% by weight and 4.2% by weight respectively.

The catalyst A4 is prepared by dry impregnation of the spent catalyst A1 with an aqueous solution of molybdenum oxide, of cobalt hydroxide, of orthophosphoric acid and of citric acid, the volume of the solution containing the precursors of the metals being strictly equal to the pore volume of the mass of the spent catalyst A1. The concentration of the metal precursors in aqueous solution is adjusted so as to obtain the desired percentage by weight of molybdenum, cobalt and phosphorus on the final catalyst. The citric acid to molybdenum molar ratio is 0.4 on the final catalyst. After dry impregnation on the spent catalyst A1, the catalyst A4 is left to mature for 1 h 30 in a water-saturated chamber and dried under air in an oven at 120° C. for 12 hours.

The catalyst A4 obtained after drying has a content of 18.5% by weight of molybdenum (MoO$_3$ equivalent), 4.5% by weight of cobalt (CoO equivalent) and 1.3% by weight of phosphorus (P$_2$O$_5$ equivalent), a Co/Mo atomic ratio of 0.47, a P/Mo atomic ratio of 0.14 and a specific surface of 103 m$^2$/g. The molar ratio of the metal from group VIb added per metal from group VIb already present in the spent catalyst A1 is 1.0 mol/mol.

Example 5—Preparation of a Fresh Calcined CoMoP Catalyst A5 (Comparative)

The support of the catalyst A5 is a transition alumina with a specific surface of 140 m$^2$/g and a pore volume of 1.0 cm$^3$/g. The catalyst A5 is prepared by dry impregnation of the support with an aqueous solution of molybdenum oxide, of cobalt hydroxide and of orthophosphoric acid, the volume of the solution containing the precursors of the metals being strictly equal to the pore volume of the mass of alumina support. The concentration of the metal precursors in aqueous solution is adjusted so as to obtain the desired percentage by weight of molybdenum, cobalt and phosphorus on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst A5 obtained after calcination has a content of 10.3% by weight of molybdenum (MoO$_3$ equivalent), 2.0% by weight of cobalt (CoO equivalent) and 1.2% by weight of phosphorus (P$_2$O$_5$ equivalent). This catalyst exhibits a Co/Mo atomic ratio of 0.37, a P/Mo atomic ratio of 0.24 and a specific surface of 121 m$^2$/g.

Example 6—Preparation of a Rejuvenated Catalyst A6 by Addition of Co and Mo (According to the Invention)

The fresh catalyst A5 is used to desulfurize a catalytic cracking (FCC) gasoline, the characteristics of which are collated in table 1. The reaction is carried out at 290° C. for 1500 hours in a reactor of traversed bed type under the following conditions: P=2 MPa, HSV=4 h$^{-1}$, H$_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst A5 is withdrawn from the reactor on conclusion of the hydrodesulfurization of a catalytic cracking (FCC) gasoline described above. The spent catalyst A5 is subsequently washed with toluene in a Soxhlet at 250° C. for 7 hours. Its residual carbon and sulfur contents are 5.7% by weight and 4.5% by weight respectively.

The catalyst A6 is prepared by dry impregnation of the spent catalyst A5 with an aqueous solution of ammonium heptamolybdate and of cobalt nitrate, the volume of the solution containing the precursors of the metals being strictly equal to the pore volume of the mass of the spent catalyst A5. The concentration of the metal precursors in aqueous solution is adjusted so as to obtain the desired percentage by weight of molybdenum and cobalt on the final catalyst. After dry impregnation on the spent catalyst A5, the catalyst A6 is left to mature for 1 h 30 in a water-saturated chamber and then dried under air in an oven at 90° C. for 12 hours.

The catalyst A6 obtained after drying has a content of 18.5% by weight of molybdenum ($MoO_3$ equivalent), 4.5% by weight of cobalt (CoO equivalent) and 1.2% by weight of phosphorus ($P_2O_5$ equivalent), a Co/Mo atomic ratio of 0.47, a P/Mo atomic ratio of 0.13 and a specific surface of 101 $m^2/g$. The molar ratio of the metal from group VIb added per metal from group VIb already present in the spent catalyst A1 is 0.8 mol/mol.

Example 7—Preparation of a Rejuvenated Catalyst A7 by Addition of Co, Mo and P (According to the Invention)

The fresh catalyst A5 is used to desulfurize a catalytic cracking (FCC) gasoline, the characteristics of which are collated in table 1. The reaction is carried out at 270° C. for 1400 hours in a reactor of traversed bed type under the following conditions: P=2 MPa, HSV=4 $h^{-1}$, $H_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst A5 is withdrawn from the reactor on conclusion of the hydrodesulfurization of a catalytic cracking (FCC) gasoline described above in table 1. The spent catalyst A5 is subsequently washed with toluene in a Soxhlet at 250° C. for 7 hours. Its residual carbon and sulfur contents are 3.0% by weight and 4.2% by weight respectively. Its specific surface is 120 $m^2/g$.

The catalyst A7 is prepared by dry impregnation of the spent catalyst A5 with an aqueous solution of molybdenum oxide, of cobalt hydroxide and of orthophosphoric acid, the volume of the solution containing the precursors of the metals being strictly equal to the pore volume of the mass of the spent catalyst A5. The concentration of the metal precursors in aqueous solution is adjusted so as to obtain the desired percentage by weight of molybdenum, cobalt and phosphorus on the final catalyst. After dry impregnation on the spent catalyst A5, the catalyst A7 is left to mature for 1 h 30 in a water-saturated chamber and dried under air in an oven at 120° C. for 12 hours.

The catalyst A7 obtained after drying has a content of 15.3% by weight of molybdenum ($MoO_3$ equivalent), 3.4% by weight of cobalt (CoO equivalent) and 2.5% by weight of phosphorus ($P_2O_5$ equivalent), a Co/Mo atomic ratio of 0.43, a P/Mo atomic ratio of 0.33 and a specific surface of 104 $m^2/g$. The molar ratio of the metal from group VIb added per metal from group VIb already present in the spent catalyst A5 is 0.5 mol/mol.

Example 8—Preparation of a Rejuvenated Catalyst A8 by Addition of Co, Mo, P and Citric Acid (According to the Invention)

The fresh catalyst A5 is used to desulfurize a catalytic cracking (FCC) gasoline, the characteristics of which are collated in table 1. The reaction is carried out at 250° C. for 800 hours in a reactor of traversed bed type under the following conditions: P=2 MPa, HSV=4 $h^{-1}$, $H_2$/HC=400 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst A5 is withdrawn from the reactor on conclusion of the hydrodesulfurization of a catalytic cracking (FCC) gasoline described above in table 1. The spent catalyst A5 is subsequently washed with toluene in a Soxhlet at 250° C. for 7 hours. Its residual carbon and sulfur contents are 1.5% by weight and 4.5% by weight respectively.

The catalyst A8 is prepared by dry impregnation of the spent catalyst A5 with an aqueous solution of molybdenum oxide, of cobalt hydroxide, of orthophosphoric acid and of citric acid, the volume of the solution containing the precursors of the metals being strictly equal to the pore volume of the mass of the spent catalyst A5. The concentration of the metal precursors in aqueous solution is adjusted so as to obtain the desired percentage by weight of molybdenum, cobalt and phosphorus on the final catalyst. The citric acid to molybdenum molar ratio is 0.4 on the final catalyst. After dry impregnation on the spent catalyst A5, the catalyst A8 is left to mature for 1 h 30 in a water-saturated chamber and dried under air in an oven at 120° C. for 12 hours.

The catalyst A8 obtained after drying has a content of 18.5% by weight of molybdenum ($MoO_3$ equivalent), 4.5% by weight of cobalt (CoO equivalent) and 1.3% by weight of phosphorus ($P_2O_5$ equivalent), a Co/Mo atomic ratio of 0.43, a P/Mo atomic ratio of 0.33 and a specific surface of 103 $m^2/g$. The molar ratio of the metal from group VIb added per metal from group VIb already present in the spent catalyst A5 is 0.8 mol/mol.

Example 9—Evaluation of the Catalysts A1 (Fresh), A2, A3 and A4

A model feedstock representative of a catalytic cracking (FCC) gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization (HDS) reaction is carried out in a fixed traversed bed reactor under a total pressure of 1.5 MPa, 210° C., HSV=6 $h^{-1}$ (HSV=flow rate by volume of feedstock/volume of catalyst) in the presence of 4 ml of catalyst. Prior to the HDS reaction, the catalyst is sulfided in situ at 350° C. for 2 hours under a flow of $H_2$ containing 15 mol % of $H_2S$ at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated from the catalytic activity and the selectivity. The HDS activity is expressed from the rate constant for the HDS reaction of 3-methylthiophene (kHDS), standardized per volume of catalyst introduced, assuming first order kinetics with respect to the sulfur compound. The HydO activity is expressed from the rate constant for the hydrogenation reaction of the olefin (HydO), namely, in the present case, for the hydrogenation reaction of 2,3-dimethylbut-2-ene, standardized per volume of catalyst introduced, assuming first order kinetics with respect to the olefin. The selectivity of the catalyst is expressed as standardized ratio of the rate constants kHDS/kHydO. The kHDS/kHydO ratio will be higher the more selective the catalyst, signifying a limited hydrogenation of the 2,3-dimethylbut-2-ene. An increase in the kHDS/kHydO ratio is thus favorable with regard to the quality of the gasoline obtained on conclusion of the hydrodesulfurization reaction, since, as the hydrogenation of the olefins has been limited, the loss in octane number of the resulting gasoline is greatly minimized.

The HDS activity and the selectivity of the catalysts are given in the following table. The values are standardized by taking the fresh catalyst A1 as reference, that is to say that the HDS activity and the selectivity of the catalysts A2, A3 and A4 are compared relative to those of the fresh catalyst A1, for which the HDS activity and the selectivity are set at 100. It is observed that the catalysts according to the invention show an increase in the selectivity while maintaining the activity.

TABLE 2

| Catalysts | A1 (comp.) | A2 | A3 | A4 |
|---|---|---|---|---|
| Relative HDS activity | 100 | 102 | 108 | 111 |
| Relative selectivity | 100 | 118 | 126 | 127 |

Example 10—Evaluation of the Catalysts A5, A6, A7 and A8

The catalysts A5 (fresh), A6, A7 and A8 are tested under the conditions of example 9. The HDS activity and the selectivity of the catalysts are given in the following table. The values are standardized by taking the fresh catalyst A5 as reference, that is to say that the HDS activity and the selectivity of the catalysts A6, A7 and A8 are compared relative to those of the fresh catalyst A5, for which the HDS activity and the selectivity are set at 100. It is observed that the catalysts according to the invention show an increase in the selectivity while maintaining the activity.

TABLE 3

| Catalysts | A5 (comp.) | A6 | A7 | A8 |
|---|---|---|---|---|
| Relative HDS activity | 100 | 100 | 105 | 109 |
| Relative selectivity | 100 | 107 | 111 | 115 |

The invention claimed is:

1. A process comprising rejuvenating an at least partially spent catalyst resulting from a hydrotreating process, said at least partially spent catalyst resulting from a fresh catalyst comprising at least one metal from group VIII, at least one metal from group VIb, an oxide support, and optionally phosphorus, said at least partially spent catalyst being a non-regenerated at least partially spent catalyst which has not undergone a regeneration state after use in the hydrotreating process and additionally comprising carbon in a content of 2% to 20% by weight, with respect to the total weight of the at least partially spent catalyst, and sulfur in a content of 1% to 8% by weight, with respect to the total weight of the at least partially spent catalyst, said process comprising:
   a) contacting said at least partially spent catalyst with an impregnation solution containing a compound comprising a metal from group VIb,
   b) drying at a temperature of less than 200° C. so as to obtain a rejuvenated catalyst, without subsequent calcination.

2. The process as claimed in claim 1, having, in a), a molar ratio of metal from group VIb added per metal from group VIb already present in the at least partially spent catalyst of 0.15 to 2.5 mol/mol.

3. The process as claimed in claim 1, in which, in a), the impregnation additionally contains a compound comprising a metal from group VIII; and a molar ratio of the metal from group VIII added per metal from group VIII already present in the at least partially spent catalyst of 0.1 to 2.5 mol/mol.

4. The process as claimed in claim 1, in which, in a), the impregnation additionally contains phosphorus; at a molar ratio of phosphorus added per metal from group VIb already present in the at least partially spent catalyst of 0.1 to 2.5 mol/mol.

5. The process as claimed in claim 1, in which, in a), the impregnation solution additionally contains an organic compound containing oxygen and/or nitrogen and/or sulfur; at a molar ratio of the organic compound added per metal from group VIb already present in the at least partially spent catalyst of 0.01 to 5 mol/mol.

6. The process as claimed in claim 5, in which the organic compound containing oxygen and/or nitrogen and/or sulfur is a compound comprising one or more chemical functional groups that are a carboxylic, alcohol, thiol, thioether, sulfone, sulfoxide, ether, aldehyde, ketone, ester, carbonate, amine, nitrile, imide, oxime, urea or amide functional group or compounds including a furan ring or sugars.

7. The process as claimed in claim 6, in which the organic compound containing oxygen and/or nitrogen and/or sulfur is γ-valerolactone, 2-acetylbutyrolactone, triethylene glycol, diethylene glycol, ethylene glycol, ethylenediaminetetraacetic acid, maleic acid, malonic acid, citric acid, gluconic acid, di($C_1$-$C_4$ alkyl) succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone or 4-aminobutanoic acid.

8. The process as claimed in claim 1, in which, in a), the impregnation solution comprises a water-ethanol or water-methanol mixture.

9. The process as claimed in claim 1, in which the rejuvenation a) is preceded by deoiling which comprises bringing the at least partially spent catalyst into contact with a stream of inert gas at a temperature of 300° C. to 400° C.

10. The process as claimed in claim 1, in which the fresh catalyst has a content of metal from group VIb of 1% to 40% by weight of oxide of said metal from group VIb, with respect to the total weight of the catalyst.

11. The process as claimed in claim 1, in which the fresh catalyst has a content of metal from group VIII of 0.1% to 10% by weight of oxide of said metal from group VIII, with respect to the total weight of the catalyst.

12. The process as claimed in claim 1, in which the fresh catalyst has a phosphorus content of 0.3% to 10% by weight, expressed as $P_2O_5$, with respect to the total weight of the catalyst and the phosphorus/(metal from group VIb) molar ratio in the catalyst is 0.1 to 0.7.

13. The process as claimed in claim 1, in which the oxide support of the fresh catalyst is alumina, a silica, a silica-alumina, titanium or magnesium oxid, used alone or as a mixture with alumina or silica-alumina.

14. The process as claimed in claim 1, in which the at least partially spent catalyst results from a process for the selective hydrodesulfurization of a sulfur-containing olefinic gasoline cut.

15. The process as claimed in claim 1, in which the rejuvenated catalyst is subjected to a sulfidation before or during the hydrodesulfurization process.

* * * * *